United States Patent
Komatsu

(10) Patent No.: US 7,028,496 B2
(45) Date of Patent: Apr. 18, 2006

(54) AIR-CONDITIONING SYSTEM FOR VEHICLE

(75) Inventor: Shunji Komatsu, Isesaki (JP)

(73) Assignee: Sanden Corporation, Isesaki (JP)

( * ) Notice: Subject to any disclaimer, the term of this patent is extended or adjusted under 35 U.S.C. 154(b) by 0 days.

(21) Appl. No.: 10/851,178

(22) Filed: May 24, 2004

(65) Prior Publication Data

US 2004/0237558 A1    Dec. 2, 2004

(30) Foreign Application Priority Data

May 27, 2003    (JP) ............................ 2003-149470

(51) Int. Cl.
*B60H 1/32*    (2006.01)
(52) U.S. Cl. .......................... 62/239; 62/323.1; 169/62
(58) Field of Classification Search .................. 62/126, 62/129, 133, 174, 239, 244, 132, 323.1; 169/62
See application file for complete search history.

(56) References Cited

U.S. PATENT DOCUMENTS

| | | | | |
|---|---|---|---|---|
| 3,788,666 A * | 1/1974 | Kramer et al. ............... | 280/739 |
| 4,133,186 A * | 1/1979 | Brucken et al. ............ | 62/228.1 |
| 5,515,691 A | 5/1996 | Wertenbach et al. | |
| 5,564,280 A * | 10/1996 | Schilling et al. ............... | 62/84 |
| 5,794,915 A * | 8/1998 | Shimizu et al. .............. | 251/127 |
| 5,899,086 A * | 5/1999 | Noda et al. .................... | 62/244 |
| 5,908,074 A * | 6/1999 | Potts ............................ | 169/60 |
| 5,934,379 A | 8/1999 | Ostlyngen et al. | |
| 6,240,738 B1 * | 6/2001 | Kato et al. .................... | 62/239 |
| 6,352,121 B1 * | 3/2002 | Pitell et al. ................... | 169/62 |
| 6,378,617 B1 * | 4/2002 | Brennan ....................... | 169/62 |
| 6,578,639 B1 * | 6/2003 | Osime et al. ................. | 169/68 |
| 6,612,373 B1 * | 9/2003 | Brennan ....................... | 169/62 |
| 6,644,415 B1 * | 11/2003 | Mohamed ..................... | 169/62 |
| 6,708,513 B1 * | 3/2004 | Koehler et al. ............... | 62/244 |

FOREIGN PATENT DOCUMENTS

| | | | |
|---|---|---|---|
| EP | 1029724 | | 8/2000 |
| JP | 5640182 | | 9/1981 |
| JP | 2000-16232 A | * | 1/2000 |
| JP | 2000-71755 A | * | 3/2000 |

* cited by examiner

*Primary Examiner*—Mohammad M. Ali
(74) *Attorney, Agent, or Firm*—Baker Botts L.L.P.

(57) ABSTRACT

An air-conditioning system for a vehicle includes an electronic control unit which detects a collision of the vehicle and activates an air bag of the vehicle, and a circulation passage for a refrigerant or R152a. The system further includes a discharge device which discharges the refrigerant from the circulation passage in the engine room when the control unit outputs an air-bag activation signal. The discharge device includes an electromagnetic valve adapted to opened to discharge a refrigerant from the circulation passage in the engine room when the control unit outputs the signal.

9 Claims, 3 Drawing Sheets

AIR-CONDITIONING SYSTEM FOR VEHICLE

This nonprovisional application claims priority under 35 U.S.C. §119(a) on Patent Application No. 2003-149470 filed in Japan on May 27, 2003, the entire contents of which are hereby incorporated by reference.

BACKGROUND OF THE INVENTION

1. Field of the Invention

The present invention relates to an air-conditioning system for a vehicle, and, more particularly, to an air-conditioning system suitable for usage of a refrigerant having a small global warming potential.

2. Description of the Related Art

Various kinds of measure to guarantee safety of vehicles are proposed for air-conditioning systems. One air-conditioning system equipped with such safety measure is disclosed in, for example, Japanese Utility Model Publication No. S56-40182/1981. The known safety measure has a safety valve disposed in a high-pressure portion of a refrigerant circulation passage. The safety valve is designed in such a way that when the pressure in the high-pressure portion rises abnormally, its valve element is lifted from the valve sheet therefor to open the valve, thereby discharging the refrigerant from the high-pressure portion, and the fuse circuit of the compressor is opened through the valve element, thereby cutting off the power supply to the compressor.

In consideration of the global environment, air-conditioning systems which use refrigerants having a smaller global warming potential than R134a that is a conventional refrigerant have been developed in recent years. Specifically, refrigerants of this type include a new substitute flon gas like R152a and a non-flon gas like $CO_2$ or HC. However, the use of such a refrigerant in the known air-conditioning system discussed above raises the following problems.

If a vehicle has a head-on collision and a part of the known air-conditioning system is damaged, the pressure in the high-pressure portion never rise abnormally, so that the safety valve does not open. In a case where the damaged part of the air-conditioning system lies in the refrigerant circulation passage in the instrument space therefor between the engine room and the vehicle compartment, therefore, the refrigerant which gradually leaks out from the damaged part is likely to flow into the vehicle compartment. Because the refrigerant gas such as R152a or HC is flammable, the flow of this type of gas into the vehicle compartment should be avoided. In addition, an increase in the concentration of the refrigerant, even the $CO_2$ gas, in the vehicle compartment is not desirable from the viewpoint of safety of users therein.

SUMMARY OF THE INVENTION

Accordingly, it is an object of the invention to provide an air-conditioning system for a vehicle, which prevents the leaking refrigerant from flowing into the vehicle compartment even if the vehicle has a traffic accident.

To achieve the object, an air-conditioning system for a vehicle with a safety device according to the invention is provided, the system comprises:

an electronic control unit for detecting a collision of the vehicle and activating said safety device;

a circulation passage extended from an engine room of the vehicle by way of an instrument space between the engine room and a vehicle compartment, for circulating a refrigerant; and a discharge device for discharging the refrigerant from the circulation passage in the engine room when the electronic control unit outputs an activation signal to the safety device.

Specifically, the safety device is an air bag. The discharge device includes an electromagnetic valve connected to the circulation passage in the engine room, and opened to discharge a refrigerant from the circulation passage therethrough when the electronic control unit outputs the activation signal to the air bag. A compressor, a condenser and an expansion valve are disposed in a portion of the circulation passage located inside the engine room in order with respect to the flow direction of the refrigerant, and an evaporator is disposed in the instrument space. The discharge device includes a relay which is closed based on the activation signal to the air bag from the electronic control unit and thereby allowed to supply a drive signal to the electromagnetic valve to open the electromagnetic valve.

According to the air-conditioning system discussed above, the electronic control unit reliably detects a vehicle collision and outputs an activation signal to the safety device. If the vehicle has a collision, therefore, the discharge device instantaneously discharges the refrigerant from the circulation passage into the engine room, that is, out of the vehicle by means of the electromagnetic valve. This can prevent the flow of the refrigerant into the vehicle compartment.

It is preferable that the electromagnetic valve should be located between the compressor and the expansion valve in the engine room. It is more preferable that the electromagnetic valve should be located between the condenser and the expansion valve.

According to the system, as the electromagnetic valve is inserted in the high-pressure portion of the circulation passage extending from the compressor to the expansion valve, the refrigerant can be discharged through the electromagnetic valve efficiently.

It is preferable that the discharge device should include a hose running between the outside of the vehicle and the electromagnetic valve, so that the refrigerant in the circulation passage can be discharged out of the vehicle through the hose.

The refrigerant should preferably be one of a $CO_2$ gas, a flammable refrigerant, and a mixture thereof, or more preferably be R152a.

This is because even when the air-conditioning system discussed above uses a refrigerant having a small global warming potential, such as a $CO_2$ gas, a flammable refrigerant, or a mixture thereof, refrigerant leakage into the vehicle compartment at the time of vehicle collision can be restrained as much as possible, thus preventing a secondary disaster to the driver and/or passengers. Another reason is that R152a has a property similar to that of R134a and is easily adapted to an air-conditioning system.

A further scope of applicability of the present invention will become apparent from the detailed description given hereinafter. However, it should be understood that the detailed description and specific example, while indicating preferred embodiments of the invention, are given by way of illustration only, since various changes and modifications within the sprit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION

Figure 1:
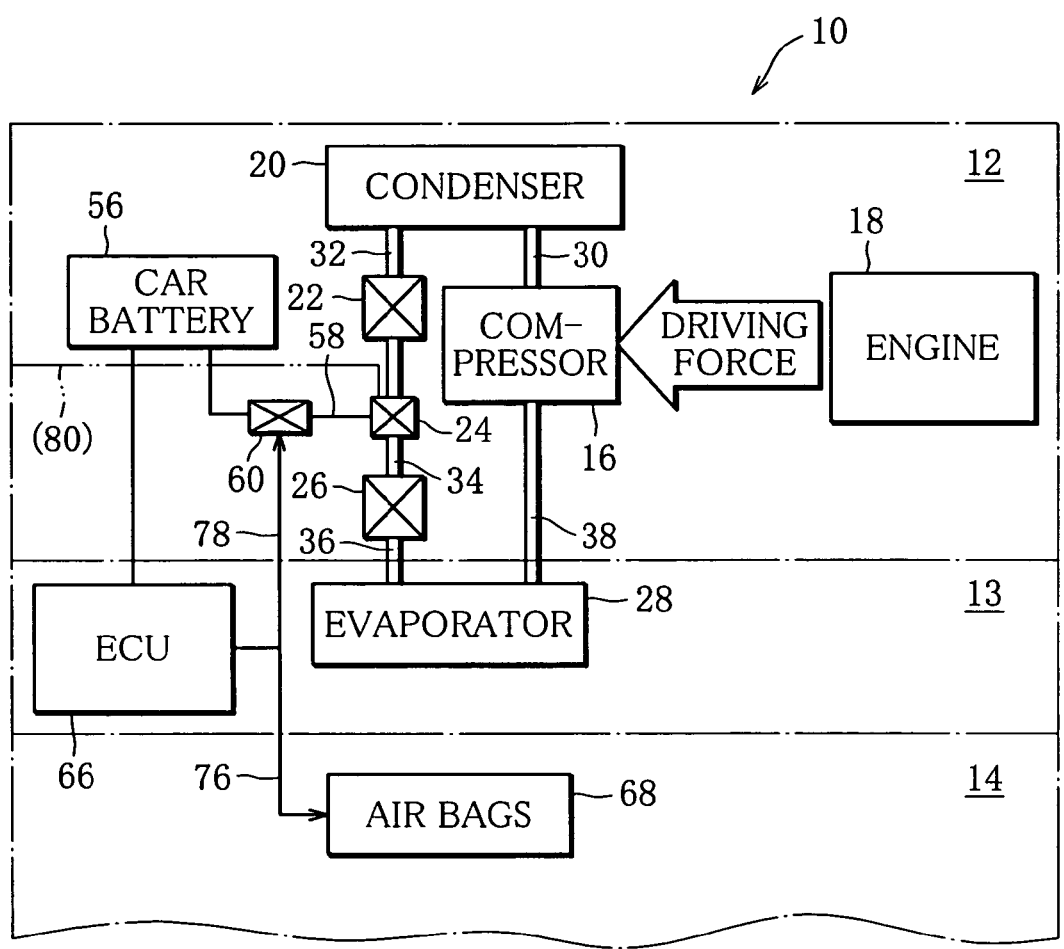
FIG. 1 is a diagram showing the schematic layout of an air-conditioning system according to one embodiment of the invention.

As shown in FIG. 1, an air-conditioning system 10 for a vehicle has a circulation passage extending from an engine room 12 of the vehicle into an instrument space 13 located between the engine room 12 and vehicle compartment 14. The system can adjust the temperature inside the vehicle compartment 14 to a desirable set temperature using the latent heat of a refrigerant that flows in the circulation passage.

A compressor 16 is disposed in the circulation passage in the engine room 12 and is operated by the driving force of an engine 18 housed in the engine room 12. The compressor 16 sucks the gaseous refrigerant through a suction port thereof, compresses the refrigerant therein and delivers the refrigerant as a high-temperature and high-pressure gas toward the downstream of the circulation passage from a discharge port thereof. That is, the compressor 16 creates the flow of the refrigerant while compressing the refrigerant.

A condenser 20 is disposed in the circulation passage at the downstream of the compressor 16 with respect to the flow direction of the refrigerant. That is, the discharge port of the compressor 16 is connected to the condenser 20 via the circulation passage. The condenser 20 cools and condenses the refrigerant received therein from the compressor 16 by the cooling air supplied from a fan (not shown).

A receiver 22 is disposed in the circulation passage at the downstream of the condenser 20. The receiver 22 performs vapor-liquid separation of the high-pressure refrigerant received therein from the condenser 20 and lets only the liquid phase of refrigerant flow downstream.

Further, an electromagnetic valve 24, an expansion valve 26 and an evaporator 28 which will be discussed later are disposed in the named order in the circulation passage at the downstream of the receiver 22.

The evaporator 28 is located in the instrument space 13. The instrument space 13 is partitioned from the vehicle compartment 14 with an instrument panel. The refrigerant in the high-pressure liquid phase from the receiver 22 is supplied via the expansion valve 26 to the evaporator 28 and evaporates to be a low-temperature, low-pressure vapor in the evaporator 28. The evaporator 28 is positioned upstream of the compressor 16 and is connected to the suction port of the compressor 16 via the circulation passage. Therefore, the low-temperature, low-pressure gaseous refrigerant evaporated in the evaporator 28 is sucked into the compressor 16.

As the opening of the expansion valve 26 is automatically changed according to the temperature of the refrigerant at the downstream of the evaporator 28, the amount of the refrigerant spurted into the evaporator 28 is controlled, thereby adjusting the temperature of the refrigerant at the downstream of the evaporator 28 to the desired temperature.

Thus, pipe lines 30, 32 and 34 shown in FIG. 1 form a high-pressure portion of the circulation passage where a high-pressure refrigerant flows, while pipe lines 36 and 38 form a low-pressure portion thereof where a low-pressure refrigerant flows.

Figure 2:
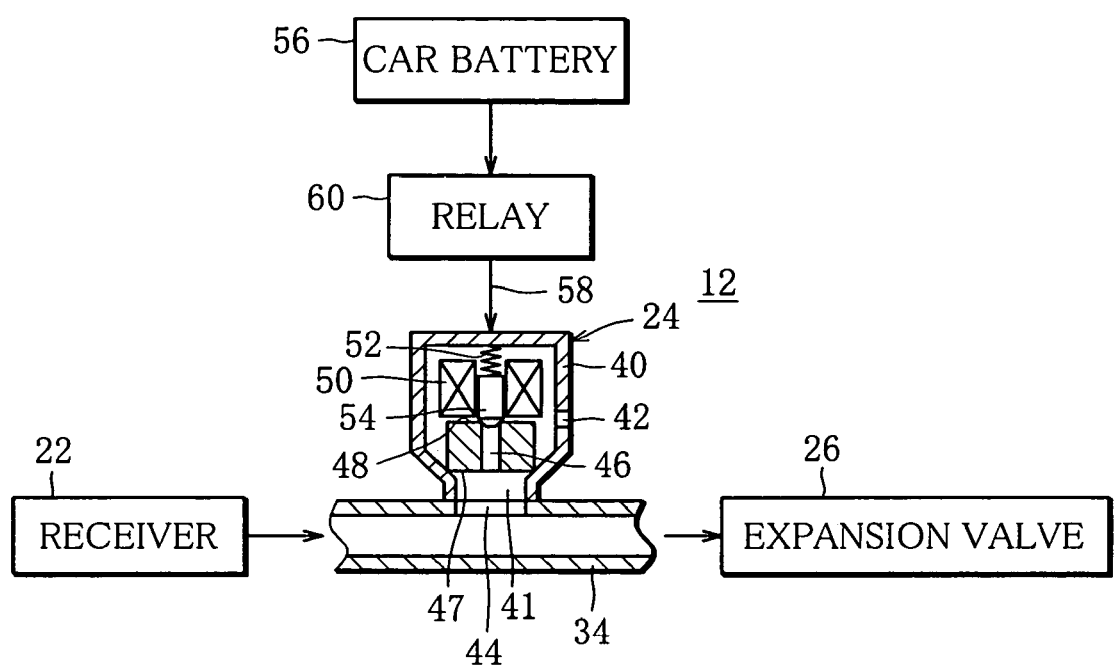
FIG. 2 is a cross-sectional view of an electromagnetic valve provided in the system in FIG. 1.

The electromagnetic valve 24 has a valve housing 40 as shown in FIG. 2. The valve housing 40 has an inlet 41 and an outlet 42 formed in its outer wall, respectively. The valve housing 40 is mounted on the pipe line 34 in such a way as to communicate the inlet 41 with a flow-out hole 44 formed in the pipe line 34. A valve passage 46 is formed through a partition wall 47 which divides the interior of the valve housing 40 into inlet and outlet chambers. The inlet chamber is located at the side of the inlet 41 and the outlet chamber is located at the side of the outlet 42.

The valve passage 46 is open in the outlet chamber to form a valve port with a valve seat 48. Normally, a valve element 54 located in the outlet chamber is urged by a valve spring 52 so that the valve element 54 is seated on the valve seat 48 and closes the valve port.

A solenoid 50 is arranged in the valve housing 40 in such a way as to surround the valve element 54. When the solenoid 50 is excited, the solenoid 50 causes the valve element 54 to lift from the valve seat 48 against the urging force of the valve spring 52 so that the valve passage 46 is opened. Therefore, the pipe line 34 communicates with the outlet 42 of the valve 24, i.e., the inside of the engine room 12 through the valve passage 46.

A power supply line 58 extending from a car battery 56 is connected to the solenoid 50. The car battery 56 supplies power to the solenoid 50 through the power supply line 58 to excite the solenoid 50.

Figure 3:
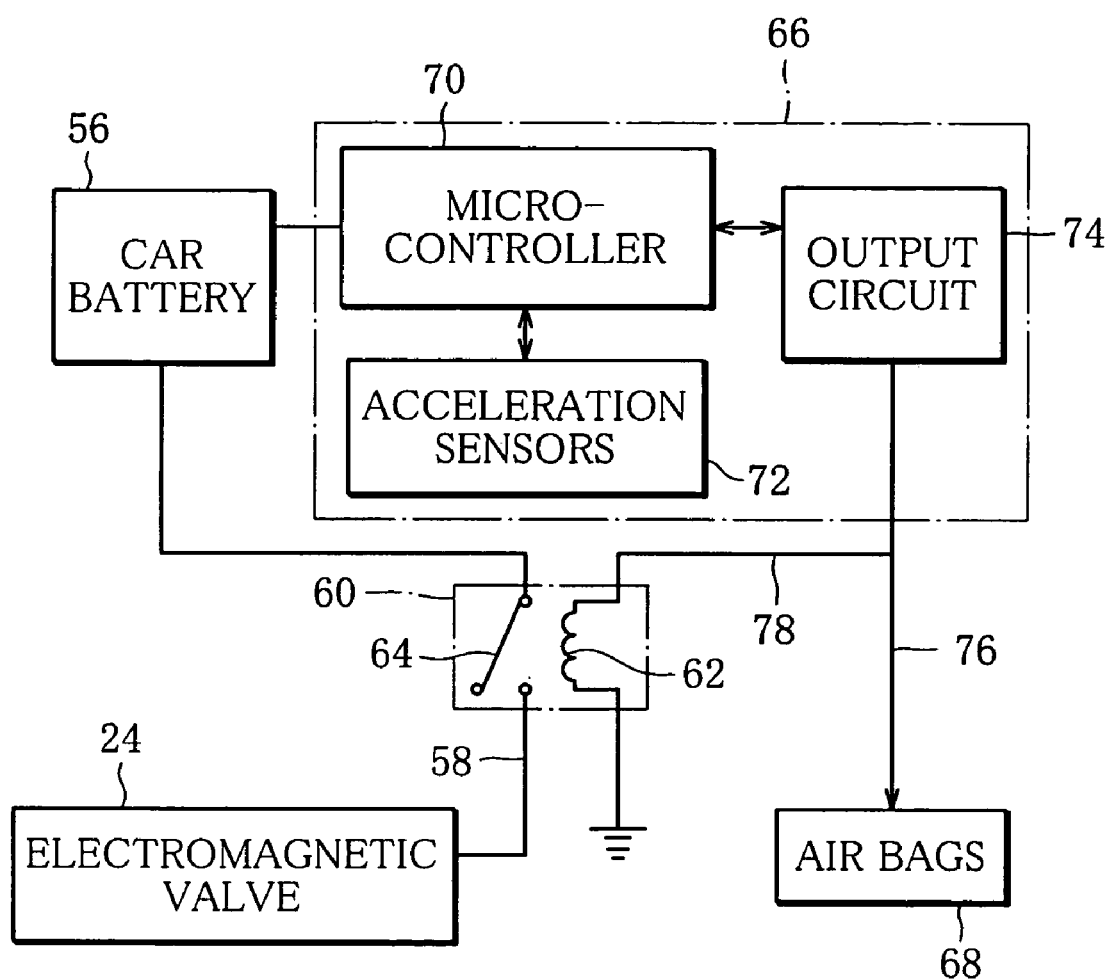
FIG. 3 is a block diagram showing an part of the system in FIG. 1.

A relay 60 is provided in the power supply line 58. For example, the relay 60 has a make contact 64 inserted in the power supply line 58 and a coil 62 for closing the make contact 64, as shown in FIG. 3. Therefore, only when the make contact 64 is closed, the power is supplied to the solenoid 50 of the valve 24 from the car battery 56 through the relay 60 and the power supply line 58.

Referring to FIG. 1 again, the vehicle is equipped with an air bag system. The air bag system includes air bags 68, such as front air bags and/or side air bags, arranged at given locations in the vehicle compartment 14 and is activated when the vehicle has a collision. The air bag system has an ECU (Electronic Control Unit) 66 operated by power supplied from the car battery 56 thereto. The ECU 66 activates at least one of the air bags 68 when estimating or detecting a vehicle collision.

More specifically, as shown in FIG. 3, the ECU 66 includes a microcontroller 70, acceleration sensors 72 and an output circuit 74. The acceleration sensors 72 detect the acceleration in the forward/rearward direction and the sideway acceleration of the vehicle, respectively and send acceleration signals to the microcontroller 70. The microcontroller 70 incorporates an ADC (Analog-Digital Converter) and EEPROM (Electrically Erasable and Programmable ROM) in the embodiment. Based on a change in the acceleration signals from the acceleration sensors 72, the microcontroller 70 determines whether a vehicle collision has occurred or not and whether at least one of the air bags 68 should be activated or not. When deciding that the activation of one of the air bags 68 is necessary, the microcontroller 70 sends an air-bag activation signal to the corresponding air bag 68 via the output circuit 74. One end of branch lines 78 is connected to signal lines 76 between the output circuit 74 and the air bags 68, and the other end of the branch lines 78 is connected to the coil 62 of the relay 60. Therefore, the air-bag activation signal sent from the output circuit 74 of the ECU 66 is also supplied to the relay 60 via at least one of the branch lines 78, causing the relay 60 to be excited by the air-bag activation signal as a drive signal.

According to the air-conditioning system 10 with the above-discussed structure, when the refrigerant circulates in the circulation passage in normal manner, the interior of the vehicle compartment 14 is cooled. That is, the refrigerant in the high-temperature and high-pressure gaseous phase, which is compressed by the compressor 16, becomes a high-pressure liquid through the condenser 20 and the receiver 22 and is sent in this state to the expansion valve 26. The expansion valve 26 spurts the refrigerant in the high-pressure liquid phase into the evaporator 28 where the refrigerant is evaporated and then returned toward the compressor 16. The refrigerant from the evaporator 28 is sucked into the compressor 16 and compressed again to deliver the high-temperature and high-pressure refrigerant toward the condenser 20.

When the refrigerant is evaporated in the evaporator 28 in the refrigerant circulation process, the heat of vaporization is taken away from the air that flows through the evaporator 28, thereby cooling down the air. The cooled air is sent into the vehicle compartment 14 by means of a blower fan (not shown) provided near the evaporator 28. This allows the cooled air to flow inside the vehicle compartment 14, cooling down the interior of the vehicle compartment 14.

If a vehicle collision occurs, the microcontroller 70 sends at least an air-bag activation signal to the corresponding air bag 68 via the output circuit 74 based on the acceleration signal from the acceleration sensor 72. As a result, the air bag 68 expands to protect a driver or passenger from the impact of the collision. The air-bag activation signal is also supplied to the coil 62 of the relay 60 via the corresponding branch line 78, thereby closing the make contact 64. The closing of the make contact 64 allows the feeding of the electric power from the car battery 56 to the solenoid 50 of the electromagnetic valve 24 via the relay 60 and the power supply line 58. Accordingly, the solenoid 50 of the valve 24 is excited and lifts the valve element 54 from the valve seat 48 against the urging force of the valve spring 52. That is, the valve 24 is supplied with the electric power as a drive signal and actuated based on the air-bag activation signal. As a result, the refrigerant flowing in the pipe line 34 or the high-pressure passage portion at the normal time is ejected into the engine room 12 through the outlet 42 of the valve 24 and is evaporated to be scattered outside the vehicle.

Even when a vehicle collision occurs, therefore, the air-conditioning system 10 instantaneously discharges the refrigerant out of the vehicle from the high-pressure portion of the circulation passage, thereby preventing the flow of the refrigerant into the vehicle compartment 14. As a result, even when a refrigerant having a small global warming potential, such as a $CO_2$ gas, a flammable refrigerant, or a mixture thereof, is used, refrigerant leakage into the vehicle compartment at the time of vehicle collision can be suppressed as much as possible, thus preventing a secondary disaster to the driver or passengers due to the refrigerant. It is preferable to use R152a among those refrigerants since R152a has a property similar to that of R134a and can easily be adapted to an air-conditioning system.

Further, the electromagnetic valve 24 of the air-conditioning system 10 opens in response to the operation of the air bag system, which can reliably estimate or detect a vehicle collision, i.e., based on the air-bag activation signal. At the time of vehicle collision, therefore, the valve 24 can surely discharge the refrigerant outside of the air-conditioning system 10 other than the vehicle compartment 14. The valve 23 also has a simple structure.

As the electromagnetic valve 24 is disposed in the high-pressure passage portion, the refrigerant can be discharged from the valve 24 efficiently.

The invention is not limited to the embodiment but can be modified in various other forms. For example, the electromagnetic valve 24 may be disposed between the receiver 22 and the condenser 20.

Because it is not desirable that the refrigerant discharged from the valve 24 stays in the engine room 12, the outlet 42 of the valve 24 should be directed, for example, to the interior of the wheel house of the vehicle. If such arrangement is difficult due to the restrictions on the layout of the circulation passage, however, a tube 80, as shown in FIG. 1, may be connected to the outlet 42 of the valve 24 so that the refrigerant discharged from the valve 24 through the tube 80 is led to the wheel house or a location apart from the vehicle compartment 14.

Further, the system 10 is adaptable to a vehicle which is equipped with a safety device, such as a seat belt pretensioner or a device for maintaining a fixed distance between vehicles. The device includes a sensor for measuring the distance by using infrared rays, microwaves or so.

What is claimed is:

1. An air-conditioning system for a vehicle, the vehicle having a safety device, the system comprising:
    an electronic control unit for detecting a collision of the vehicle and activating the safety device;
    a circulation passage extended from an engine room of the vehicle by way of an instrument space between the engine room and a vehicle compartment, for circulating a refrigerant; and
    a discharge device for discharging the refrigerant from said circulation passage in the engine room when said electronic control unit outputs an activation signal to the safety device,
    wherein said discharge device includes an electromagnetic valve connected to said circulation passage in the engine room and adapted to be opened to discharge the refrigerant from said circulation passage therethrough when said electronic control unit outputs the activation signal to said safety device,
    wherein said discharge device includes a relay adapted to be closed based on the activation signal supplied from said electronic control unit to said safety devices said relay producing a drive signal to said electromagnetic valve to open said electromagnetic valve, and
    wherein said discharge device includes a hose extending between the outside of the vehicle and said electromagnetic valve.

2. The system according to claim 1, wherein the safety device is an air bag system.

3. The system according to claim 1, wherein a compressor, a condenser and an expansion valve are inserted in a portion of said circulation passage in said engine room in order with respect to a flow direction of the refrigerant, and an evaporator is disposed in the instrument space.

4. The system according to claim 3, wherein said electromagnetic valve is located in a portion of said circulation passage between the compressor and the expansion valve, downstream from the compressor and upstream from the expansion valve.

5. The system according to claim 4, wherein said electromagnetic valve is located in a portion of said circulation passage between the condenser and the expansion valve, downstream from the condenser and upstream from the expansion valve.

6. The system according to claim 1, wherein said discharge device includes a hose extending between the outside of the vehicle and said electromagnetic valve.

7. The system according to claim 1, wherein the refrigerant is one of a $CO_2$ gas, a flammable refrigerant, and a mixture thereof.

8. The system according to claim 7, wherein the refrigerant is R152a.

9. An air-conditioning system for a vehicle, the vehicle having a safety device, the system comprising:
   an electronic control unit for detecting a collision of the vehicle and activating the safety device;
   a circulation passage extended from an engine room of the vehicle by way of an instrument space between the engine room and a vehicle compartment, for circulating a refrigerant; and
   a discharge device for discharging the refrigerant from said circulation passage in the engine room when said electronic control unit outputs an activation signal to the safety device,
   wherein said discharge device includes an electromagnetic valve connected to said circulation passage in the engine room and adapted to be opened to discharge the refrigerant from said circulation passage therethrough when said electronic control unit outputs the activation signal to said safety device, and
   wherein said discharge device includes a hose extending between the outside of the vehicle and said electromagnetic valve.

* * * * *